United States Patent [19]
Schuplin

[11] 3,758,060
[45] Sept. 11, 1973

[54] CABLE CLAMP OR FASTENER

[75] Inventor: Jerome T. Schuplin, Parma Heights, Ohio

[73] Assignee: Fastway Fasteners, Inc., Lorain, Ohio

[22] Filed: Oct. 20, 1971

[21] Appl. No.: 190,725

[52] U.S. Cl. .......... 248/74 PB, 24/16 PB, 24/73 PB
[51] Int. Cl. ......................... F16l 3/08, B65d 63/16
[58] Field of Search .................... 24/73 PB, 73 AP, 24/16 PB; 248/74 PB, 71; 85/80

[56] References Cited
UNITED STATES PATENTS

| | | | |
|---|---|---|---|
| 2,937,834 | 5/1960 | Orenick et al. | 248/71 |
| 3,335,633 | 8/1967 | Seckersan | 85/80 |
| 3,341,903 | 9/1967 | Buntic | 24/73 PB |
| 3,402,435 | 9/1968 | Merser | 24/73 PB |
| 3,550,219 | 12/1970 | Van Buren | 248/74 PB |
| 3,552,696 | 1/1971 | Orenick | 248/71 |
| 3,049,771 | 8/1962 | Litwin et al. | 24/73 PB |

*Primary Examiner*—James T. McCall
*Assistant Examiner*—Kenneth J. Dorner
*Attorney*—Isler & Ornstein

[57] ABSTRACT

A cable clamp or fastener is provided for clamping one or more cables to a wall having a hole therethrough. The clamp comprises a substantially flat flexible strap having anchor means at one end and locking means at the other end. The anchor means comprises spaced elements which are adapted to be flexed toward each other to facilitate their entry into and through said hole, and are of such configuration as to resist withdrawal through said hole when the elements are in unstressed condition. The locking means comprises a tenon-like element adapted to be introduced into the space between said anchor elements for the purpose of preventing flexing of the anchor elements toward each other, said introduction being accomplished without movement of said anchor elements to positions in which they are under stress. The locking means also includes a locking head which is movable into a position beyond the locking means, and which, when in such position, is not retractable from said anchor elements. The anchor elements and locking means provide a four-point locking contact with the edges of said hole.

8 Claims, 11 Drawing Figures

INVENTOR.
JEROME T. SCHUPLIN

CABLE CLAMP OR FASTENER

This invention relates generally to cable clamps or fasteners, but has reference more particularly to clamps or fasteners of the type shown, for example, in U.S. Pat. No. 2,937,834.

In the cable fastener disclosed in the aforesaid patent, which is made in one piece of a plastic, such as nylon, the fastener consists of a substantially flat flexible strap having anchor and lock members formed integrally therewith, and positioned at opposite ends and sides thereof. The anchor member comprises a conical head mounted on a cylindrical stem, the head and stem having a diametric slot dividing them into two identical halves free to flex toward and away from each other. The lock member comprises a solid conical head mounted on a cylindrical stem.

When the clamp is to be locked or secured in a hole in a panel wall, the lock member is inserted in the anchor member, causing the halves of the anchor head to be flexed away from each other to permanently lock both interfitted members against removal through the panel wall hole.

It has been found that this flexing of the anchor halves, or radial expansion of the anchor member, imposes a strain on the plastic, which strain continues as long as the anchor and lock members remain in place. When the clamp is subjected to vibration or changes in temperature, this continuous strain relieves itself by breaking of the halves of the anchor member from the clamp.

The present invention has, as its primary object, the provision of a cable clamp or fastener of the character described, in which the halves of the anchor member are flexed only temporarily when the anchor and lock members are interfitted with each other in the course of securing the clamp to a panel wall, but such flexing is discontinued as soon as the clamp is thus secured to the panel wall, so that there is no continuous strain to cause such breakage.

Another object of the invention is to provide a cable clamp or fastener of the character described, having a lock member which, when interfitted with the anchor member, not only fills the space between the halves of the anchor member, but also remains in contact with substantially all of the surfaces between the halves of the anchor member.

A further object of the invention is to provide a cable clamp or fastener of the character described, which has a novel four-point locking contact with the hole in the panel wall.

Other objects and advantages of my invention will be apparent during the course of the following description.

In the accompanying drawings forming a part of this specification, and in which like numerals are employed to designate like parts throughout the same, FIG. 1 is a top plan view of a cable clamp or fastener embodying the invention;

Figure 1:
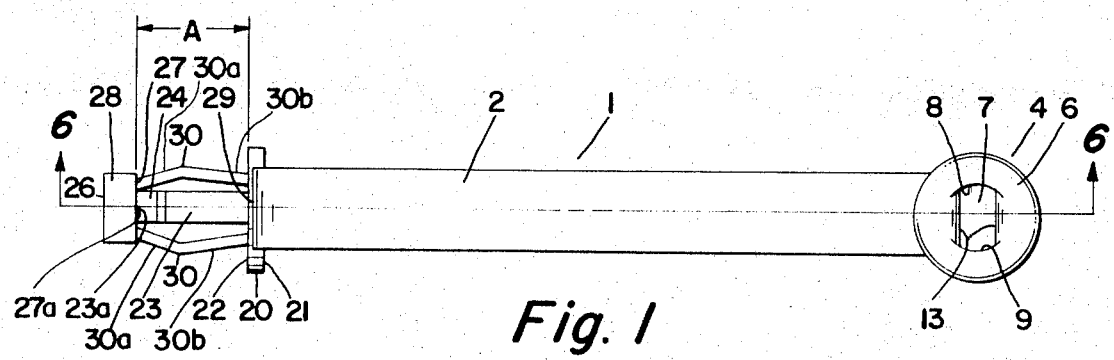

Referring more particularly to the drawings, the cable clamp which is preferably formed or molded, in a single piece, from a resilient thermoplastic material such, for example, as nylon, will be seen to comprise an elongated strip or strap 1, of uniform width and having parallel upper and lower surfaces 2 and 3.

The strap 1 is provided at one end thereof with a circular portion 4 of a diameter somewhat greater than the width of the strap, and of a thickness substantially twice the thickness of the strap, having a lower face 5 which is coplanar with the surface 3 of the strap, and an upper face 6 which is in elevated relation to the surface 2 of the strap.

The circular portion 4 of the clamp is provided with a slot or opening 7 extending diametrically thereof and perpendicularly to the direction of length of the strap 1, this slot or opening having arcuate ends 8 and 9.

Extending from the face 5 of the circular portion 4 is an anchor member comprising a pair of elements 10 and 11 spaced apart a distance equal to the width of the slot or opening 7. These elements 10 and 11 have exterior surfaces 12 of conical form, and interior flat surfaces 13 which are parallel with each other.

These elements 10 and 11 are provided respectively with extensions 14 and 15, having exterior surfaces 16 of conical form, in inverted relationship to the surfaces 12. The junctions of the extensions 14 and 15 with the elements 10 and 11 provide shoulders 17, while the lower ends of these extensions form shoulders 18. These extensions, moreover, extend radially inwardly to provide a narrow space or passageway 19 therebetween, which is narrower than the space between the surfaces 13 of the elements 10 and 11.

The elements 10 and 11 are also provided with ribs 12a of substantially semi-circular cross-section, which project outwardly from the surfaces 12 and which extend from the face 5 of the circular portion 4 to the shoulder 17, these ribs serving a purpose to be presently described.

The strap 1 is provided at its opposite end with a downturned portion 1a, having an interior face 3a which is an extension of the surface 3 of the strap 1, and an exterior face 2a which is an extension of the surface 2 of the strap 1.

The portion 1a of the strap terminates in a circular portion 20 of a diameter substantially the same as that of the portion 4, and of a thickness somewhat greater than the thickness of the portion 1a of the strap, having an inner face 21 which is coplanar with the surface 3a, and an outer face 22, which is offset outwardly from the surface 2a of the strap.

Figure 6:
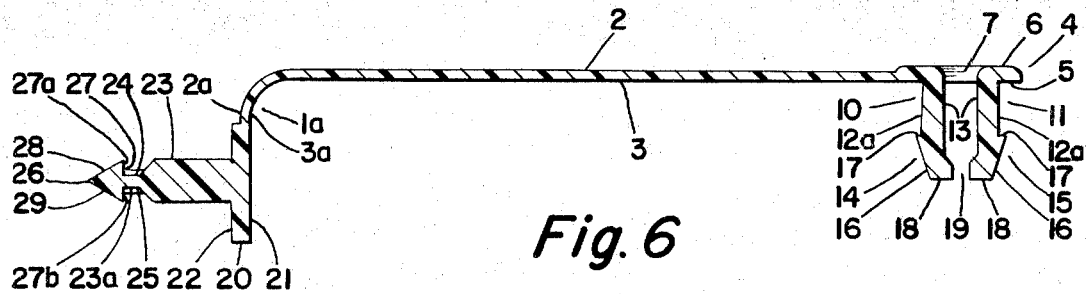
FIG. 6 is a cross-sectional view of the cable clamp, taken on the line 6—6 of FIG. 1.

Extending axially or centrally from the face 22 of the circular portion 20 is a locking member comprising a tenon-like element 23, of rectangular cross-section, the longer dimension of this cross-section (seen in FIGS. 2 and 6) being substantially the same as the width of the slot or opening 7, and the shorter dimension of this cross-section (seen in FIGS. 1 and 3) being substantially half that of the longer dimension.

This element 23 is provided at its outer end with an extension 23a, of the same width as the shorter dimension of the cross-section of the element 23, but of a height substantially less than the longer dimension of the cross-section of the element 23, so that recesses 24 and 25 are provided at the top and bottom of the extension 23a.

The extension 23a terminates in a spearhead 26, which extends laterally to both sides of the extension 23a, this spearhead having a base 27, which forms shoulders 27a and 27b at its junction with the extension 23a, and convergent sides 28 and 29.

The width or short dimension of the base 27 is the same as the long dimension of the cross-section of the element 23.

The spearhead 26 has a length slightly less than the length of the slot or opening 7, so that the spearhead is insertable into and through the latter, when the clamp is used.

The shoulders 27a and 27b of the base 27 of the spearhead are interconnected with the outer face 22 of the portion 20 of the strip by means of struts 30, consisting of portions 30a and 30b, which are disposed at an angle to each other.

It may be noted, at this point, that the distance A (FIG. 1) from the surface 22 to the base 27 of the spearhead 26 is substantially the same as the distance B (FIG. 2) from the surface 6 of circular portion 4 to the shoulders 18.

Figure 7:
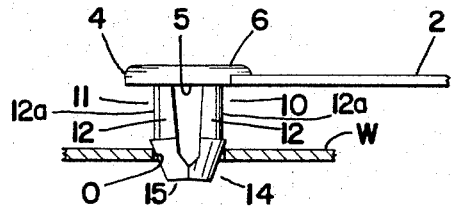
FIG. 7 is a fragmentary view, showing the initial step in inserting the anchor member of the clamp into a hole in a panel wall.

In the use of the cable clamp, such, for example, as a means of clamping one or more cables to a panel or wall W, in the manner shown in FIG. 11, the wall having a circular hole or opening 0 of a diameter slightly greater than the distance between the upper ends of the conical surfaces 12 of the elements 10 and 11, but less than distance between the upper ends of the conical surfaces 16 of the elements 14 and 15, the procedure is substantially as follows:

The elements 10, 11, 14 and 15 are introduced or pushed into the opening 0 in the manner shown in FIG. 7. In the course of this introduction, the elements are cammed by the edges of the opening toward each other, so that the passageway 19 between the elements 14 and 15 is closed. The pressure applied to push the elements through the opening 0 is sufficient to cause the material of the elements 14 and 15, just below the shoulders 17, to yield to an extent that these elements can be snapped through the opening 0, with the result that the elements 10, 11, 14 and 15 assume their normal unstressed position, as shown in FIG. 8, with the surface 5 in abutment with the wall W.

Figure 9:
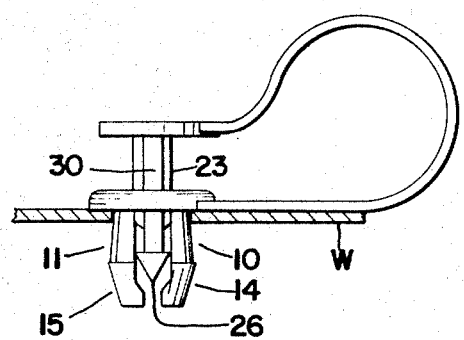
FIG. 9 is a fragmentary view, showing the locking member of the clamp partially inserted into the anchor member.

The strap 1 is then bent or flexed about the cables to be clamped to the wall W, in the manner shown in FIG. 9. In FIG. 9, the spearhead 26 has been pushed through the slot or opening 7, and the element 23 is in process of being pushed through this slot or opening. At the same time, the struts 30, which, in their normal unstressed condition, seen in FIGS. 1 and 3, have a maximum distance between their outer surfaces which is greater than the length of the slot or opening 7, are cammed or biased inwardly toward each other by the ends of this slot or opening, and are thus passed through this slot.

Figure 10:
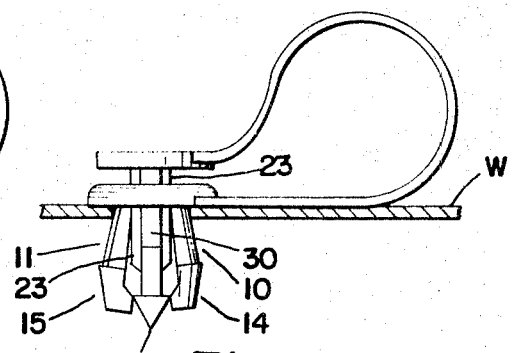
FIG. 10 is a view similar to FIG. 9, but showing the locking member further inserted into the anchor member.

In the continuation of this movement of the spearhead, the element 23, and the struts 30, as seen in FIG. 10, the spearhead has temporarily cammed the elements 10, 11, 14 and 15 away from each other to positions beyond their normal unstressed positions, and the spearhead has begun to pass through the passageway 19.

Figure 2:
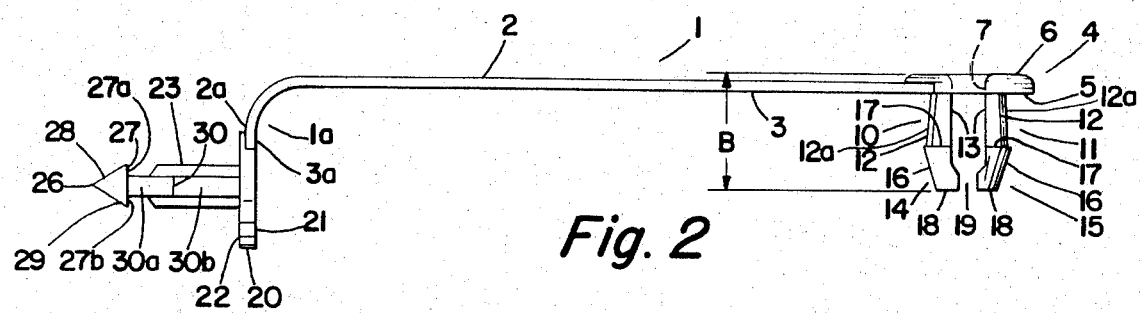
FIG. 2 is a side elevational view of the cable clamp.
Figure 3:
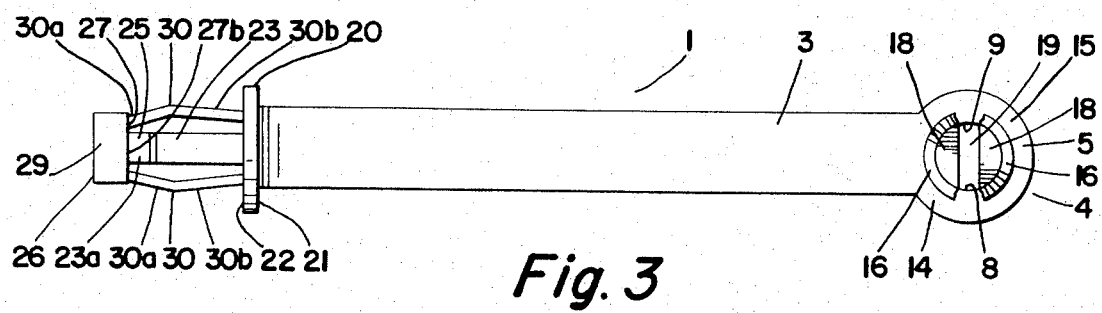
FIG. 3 is a bottom plan view of the cable clamp.
Figure 4:
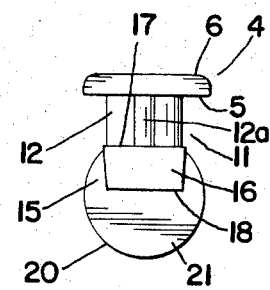
FIG. 4 is an end elevational view of the cable clamp, as viewed from the right end of FIG. 2.
Figure 5:
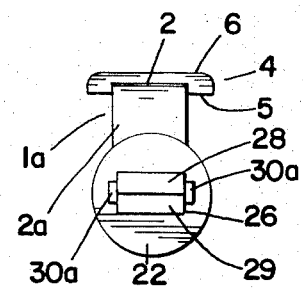
FIG. 5 is an end elevational view of the cable clamp, as viewed from the left end of FIG. 2.
Figure 8:
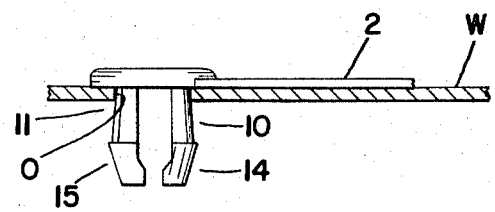
FIG. 8 is a fragmentary view, showing the anchor member inserted in the hole.
Figure 11:
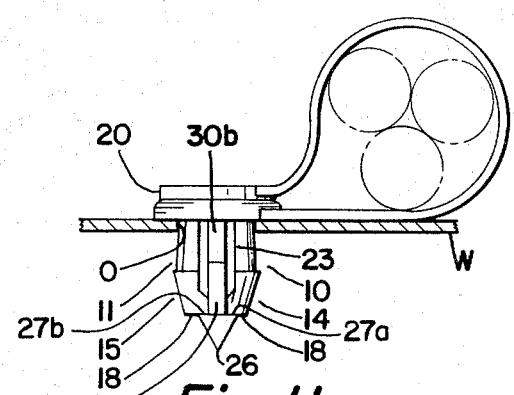
FIG. 11 is a view similar to FIG. 10, but showing the locking member fully or completely inserted in or interfitted with the anchor member.

In the final position of the parts, as seen in FIG. 11, the spearhead 26 has passed through the passageway 19, and the inherent resiliency of the elements 10, 11, 14 and 15, has caused these elements to resume their normal unstressed position or condition, i.e., the position or condition shown in FIGS. 2 and 8. At the same time, the shoulders 27a and 27b of the spearhead abut the shoulders 18 of the elements 14 and 15, so that the locking member cannot be withdrawn from the anchor member.

Referring more particularly to FIG. 11, it will be seen that the element 23 fills or completely straddles the space between the walls 13, and the extension 23a (see FIG. 6) fills or straddles the passageway 19, so that the elements 10, 11, 14 and 15 cannot be withdrawn or retracted through the opening 0, since the element 23 and its extension 23a prevent the elements 10, 11, 14 and 15 from being biased toward each other for the purpose of being thus withdrawn or retracted. At the same time, the elements 10 and 11, or, rather, the ribs 12a, and the portions 30b of the struts 30, since they tightly engage the edge of the opening 0, provide, in effect, four circumferentially-spaced locking points, which are effective to prevent such withdrawal or retraction.

Moreover, in the position shown in FIG. 11, the elements 10, 11, 14 and 15 are in their normal or unstressed position, so that there is no stress or strain acting on these elements to cause breakage thereof from the clamp, nor is there any possibility of breakage due to vibration of these parts or changes in temperature.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a cable clamp of the character described, a substantially flat flexible strap, anchor means extending from one end of the strap, said anchor means comprising a pair of spaced elements having conical exterior surfaces and flat interior surfaces which are parallel with each other, said spaced elements having extensions provided with conical exterior surfaces in inverted relationship to the conical exterior surfaces of said elements and having flat interior surfaces which are parallel with each other, but spaced from each other to a lesser extent than the spacing between said elements, and locking means extending from the other side of said strap comprising a tenon-like member having a portion of rectangular cross-section extending completely across the space between said elements and an extension of rectangular cross-section extending completely across the space between said extensions.

2. A cable clamp, as defined in claim 1, wherein said extensions terminate in base portions providing shoulders, and said tenon-like member terminates in a locking head adapted to abut said last-named shoulders.

3. The combination, as defined in claim 1, wherein said tenon-like element has a portion of rectangular cross-section, the longer dimension of which cross-section is substantially the same as the space between the interior parallel surfaces of the upper portions of the anchor elements.

4. The combination, as defined in claim 3, wherein the lower portions of said anchor elements terminate in bases forming shoulders, and said locking means terminates in a spearhead adapted to be moved beyond said shoulders and having rectangular surfaces adapted to engage said shoulders.

5. A cable clamp, as defined in claim 1, wherein said locking means comprises a tenon-like element of rectangular cross-section having an extension which completely fills the space between said parallel walls when said elements are in unstressed condition.

6. A cable clamp, as defined in claim 1, wherein flexible struts are provided which interconnect the rectangular surfaces of the spearhead with portions of the strap spaced from the tenon-like element of the locking means.

7. A cable clamp, as defined in claim 2, including flexible angulated struts which interconnect said locking head with portions of the strap spaced from the first-named portion of said tenon-like member, and spaced circumferentially approximately 90° from said first-named portion and the extension of said tenon-like member which extends across said spaces.

8. In a cable clamp including a flat flexible cable encircling strap portion and anchor means integrally formed on one end and interlocking means formed on the opposite end, the combination comprising, first panel penetrating means on said anchor including at least two spaced resilient elements each provided with a pair of oppositely outwardly directed conical surfaces defining a panel engaging shoulder at their point of intersection, passage means between said resilient elements, said interlocking means including an anchor penetrating tenon of substantially rectangular cross section and an integral resilient strut member on each side of said tenon, said struts each extending in the same general direction as said tenon but initially diverging outwardly away therefrom, said struts being directed toward said tenon and each other at approximately their respective midpoints and converging at their free ends to combine with a portion of said tenon, means defining a spear-like head on said tenon dimensioned to penetrate said anchor in the space between said resilient elements and inhibit withdrawal of said anchor from said panel, each of said strut members being dimensioned at their point of maximum divergence to extend laterally outwardly beyond said resilient elements and engage the rear face of said panel, and locking means defined by a portion of said spearhead and the free ends of said resilient elements to inhibit withdrawal of said interlocking means from said anchor means.

* * * * *